United States Patent
Kwon et al.

(10) Patent No.: US 8,785,020 B2
(45) Date of Patent: *Jul. 22, 2014

(54) ANODE FOR CABLE-TYPE SECONDARY BATTERY AND CABLE-TYPE SECONDARY BATTERY INCLUDING THE ANODE

(75) Inventors: Yo-Han Kwon, Daejeon (KR); Je-Young Kim, Daejeon (KR); Ki-Tae Kim, Daejeon (KR); Heon-Cheol Shin, Busan (KR); Hyung-Man Cho, Busan (KR); Hye-Ran Jung, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,024

(22) Filed: Jul. 2, 2012

(65) Prior Publication Data

US 2012/0295144 A1 Nov. 22, 2012

Related U.S. Application Data

(63) Continuation of application No. PCT/KR2011/003679, filed on May 18, 2011.

(30) Foreign Application Priority Data

Jun. 28, 2010 (KR) .................. 10-2010-0061175

(51) Int. Cl.
*H01M 4/00* (2006.01)
*H01M 6/10* (2006.01)

(52) U.S. Cl.
USPC .............................. 429/94; 429/149; 429/209

(58) Field of Classification Search
CPC ..... H01M 4/134; H01M 4/661; H01M 4/667; H01M 4/75; H01M 10/0436; H01M 10/058; H01M 4/0452; Y02E 60/122; Y02E 60/12

USPC .................................... 429/94, 149, 164, 209
IPC ....................................... H01M 6/10,6/42, 6/44
See application file for complete search history.

(56) References Cited

U.S. PATENT DOCUMENTS

| 2004/0023119 A1 | 2/2004 | Mizutani et al. |
| 2006/0115735 A1 | 6/2006 | Yasuda et al. |

(Continued)

FOREIGN PATENT DOCUMENTS

| JP | 4-169066 A | 6/1992 |
| JP | 8-88019 A | 4/1996 |

(Continued)

*Primary Examiner* — Basia Ridley
*Assistant Examiner* — Heng Chan
(74) *Attorney, Agent, or Firm* — Birch, Stewart, Kolasch & Birch, LLP (57) ABSTRACT

Disclosed is an anode for a lithium secondary battery. The anode includes a current collector in the form of a wire and a porous anode active material layer coated to surround the surface of the current collector. The three-dimensional porous structure of the active material layer increases the surface area of the anode. Accordingly, the mobility of lithium ions through the anode is improved, achieving superior battery performance. In addition, the porous structure allows the anode to relieve internal stress and pressure, such as swelling, occurring during charge and discharge of a battery, ensuring high stability of the battery while preventing deformation of the battery. These advantages make the anode suitable for use in a cable-type secondary battery. Further disclosed is a lithium secondary battery including the anode.

19 Claims, 5 Drawing Sheets

(56) References Cited

U.S. PATENT DOCUMENTS

| | | |
|---|---|---|
| 2007/0243456 A1 | 10/2007 | Ahn et al. |
| 2008/0131784 A1 | 6/2008 | Hwang et al. |
| 2008/0137890 A1 | 6/2008 | Petersen et al. |
| 2008/0268338 A1* | 10/2008 | Lee et al. ............ 429/218.1 |
| 2009/0107746 A1 | 4/2009 | Horie et al. |
| 2010/0119944 A1* | 5/2010 | Kim et al. ............ 429/231.5 |
| 2010/0216026 A1* | 8/2010 | Lopatin et al. ............ 429/246 |
| 2011/0274954 A1* | 11/2011 | Cho et al. ............ 429/94 |

FOREIGN PATENT DOCUMENTS

| | | | | |
|---|---|---|---|---|
| JP | 9-7629 A | | 1/1997 | |
| JP | 2001-110445 A | | 4/2001 | |
| JP | 2001-313038 A | | 11/2001 | |
| JP | 2004-39491 A | | 2/2004 | |
| JP | 2004-139768 A | | 5/2004 | |
| JP | 2004-193062 A | | 7/2004 | |
| JP | 2006-260886 A | | 9/2006 | |
| JP | 2007-87789 A | | 4/2007 | |
| JP | 2010-73533 A | | 4/2010 | |
| JP | 2010-129412 A | | 10/2010 | |
| KR | 10-2005-0030438 A | | 3/2005 | |
| KR | 10-2005-0099903 A | | 10/2005 | |
| KR | 10-2007-0009231 | * | 1/2007 | |
| KR | 10-2007-0075928 | * | 7/2007 | |
| KR | 10-0804411 B1 | | 2/2008 | |
| KR | 10-2008-0067371 A | | 7/2008 | |
| WO | WO 2005098994 A1 | * | 10/2005 | ............ H01M 2/10 |
| WO | WO 2010076975 A2 | * | 7/2010 | ............ H01M 2/20 |

* cited by examiner

ANODE FOR CABLE-TYPE SECONDARY BATTERY AND CABLE-TYPE SECONDARY BATTERY INCLUDING THE ANODE

CROSS-REFERENCE TO RELATED APPLICATION

This application is a continuation of International Application No. PCT/KR2011/003679 filed on May 18, 2011, which claims priority under 35 USC 119(a) to Korean Patent Application No. 10-2010-0061175 filed in the Republic of Korea on Jun. 28, 2010, the entire contents of which are incorporated herein by reference.

TECHNICAL FIELD

The present disclosure relates to an anode suitable for use in a cable-type secondary battery and a cable-type secondary battery including the anode.

BACKGROUND ART

Secondary batteries refer to devices which convert external electrical energy into chemical energy, store the electrical energy and generate electricity from the chemical energy when necessary. Secondary batteries are also called "rechargeable batteries," which means that they are capable of repeated charge and discharge. Lead-acid batteries, nickel cadmium (NiCd) batteries, nickel metal hydride (NiMH) batteries, lithium ion batteries and lithium ion polymer batteries are frequently used as secondary batteries. Secondary batteries offer economic and environmental advantages over primary batteries that are disposed of after energy stored therein has been exhausted.

Secondary batteries are currently used in applications where low power is needed, for example, devices for assisting in the start-up of car engines, portable devices, instruments and uninterrupted power supply systems. Recent developments in wireless communication technologies have led to the popularization of portable devices and have brought about a tendency to connect many kinds of existing devices to wireless networks. As a result, demand for secondary batteries is dramatically increasing. Secondary batteries are also used in environmentally friendly next-generation vehicles such as hybrid vehicles and electric vehicles to reduce the costs and weight and to increase the service life of the vehicles.

Generally, most secondary batteries have a cylindrical, prismatic or pouch type shape depending on the fabrication process thereof. That is, a secondary battery is typically fabricated by inserting an electrode assembly composed of an anode, a cathode and a separator into a cylindrical or prismatic metal can or a pouch-type case made of an aluminum laminate sheet, and injecting an electrolyte into the electrode assembly. Accordingly, the cylindrical, prismatic or pouch-type secondary battery requires a certain space for assembly, which is an obstacle to the development of various types of portable devices. Thus, there is a need for a novel type of secondary battery that is easily adaptable in shape. In response to this need, highly flexible linear batteries, for example, cable-type secondary batteries with a high ratio of length to cross-sectional diameter have been proposed.

However, such a cable-type secondary battery requiring high flexibility is prone to deformation because it is exposed to frequent external physical impact in view of its structural characteristics. For example, the cable-type secondary battery may be bent by frequent external physical impact. This deformation increases the risk of disconnection during use. Another problem is that an anode active material, such as Si or Sn, is separated when electrodes of the cable-type secondary battery are expanded and contracted during repeated charge and discharge. In this case, the cable-type secondary battery suffers from a more serious deterioration in performance by frequent physical impact than general secondary batteries do.

DISCLOSURE

Technical Problem

The present disclosure is designed to solve the problems of the prior art, and therefore it is an object of the present disclosure to provide a porous anode for a lithium secondary battery that exhibits high electrochemical reactivity and is capable of relieving internal stress and pressure of the battery.

Technical Solution

According to an aspect of the present disclosure, there is provided an anode for a cable-type secondary battery which includes a core as a current collector and a porous shell as an anode active material coated to surround the outer surface of the core, the current collector having a horizontal cross section in a predetermined shape and extending in the lengthwise direction.

The anode active material may include at least one element or compound selected from the group consisting of Si, Sn, Li, Zn, Mg, Cd, Ce, Ni, Fe and oxides thereof.

The current collector may be stainless steel, aluminum, titanium, silver, palladium, nickel, copper, or stainless steel surface treated with titanium, silver, palladium, nickel or copper. Alternatively, the current collector in the form of a wire may include a polymer core and a metal coating layer formed on the surface of the polymer core.

Examples of materials for the polymer core include polyacetylene, polyaniline, polypyrrole, polythiophene, poly(sulfur nitride), polyethylene (PE), polypropylene (PP), polyvinyl chloride (PVC), polyvinyl alcohol (PVA), polyacrylate and polytetrafluoroethylene (PTFE). The metal coating layer may be formed of at least one metal selected from silver, palladium, nickel and copper.

The porous shell may have a pore size of 10 to 150 μm, a porosity of 60 to 95%, and a surface area of $8 \times 10^4$ to $5 \times 10^5$ cm$^2$/g.

According to another aspect of the present disclosure, there is provided a method for producing an anode for a cable-type secondary battery, the method including: (S1) preparing an aqueous solution of an anode active material; and (S2) dipping a core as a current collector having a horizontal cross section in a predetermined shape and extending in the lengthwise direction in the aqueous solution of the anode active material, and applying an electric current to the core to form a porous shell on the outer surface of the core.

The porous anode of the present disclosure is suitable for use in a lithium secondary battery, particularly a cable-type secondary battery.

Advantageous Effects

The anode of the present disclosure has a cushioning function due to its porous structure. Accordingly, the anode of the present disclosure is highly resistant to external physical impact. For example, the anode of the present disclosure can withstand impact caused by the bending of a secondary battery to prevent the secondary battery from disconnection. In addition, the anode of the present disclosure can relieve internal stress and pressure, such as swelling, occurring during charge and discharge of a battery using an anode active material, such as Si or Sn, to achieve high stability of the battery while preventing deformation of the battery.

The anode of the present disclosure has a high surface area due to the presence of a porous shell composed of an anode active material. Accordingly, the anode of the present disclosure has an increased contact area with an electrolyte, particularly a solid electrolyte, contributing to an improvement in the mobility of lithium ions. This improved mobility ensures high ionic conductivity of the electrolyte, leading to superior battery performance.

These advantages make the anode of the present disclosure suitable for use in a cable-type secondary battery.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

| [Explanation of reference numerals] | |
| --- | --- |
| 10: Porous anode | 11: Current collector |
| 12: Anode active material layer | |
| 20: Porous anode | 21: Polymer core |
| 22: Metal coating layer | 23: Anode active material layer |
| 30: Cable-type secondary battery | 31: Inner current collector |
| 32: Anode active material layer | 33: Electrolyte layer |
| 33a: First electrolyte layer | 33b: Second electrolyte layer |
| 34: Cathode active material layer | 35: Outer current collector |
| 36: Protective cover | |

BEST MODE

Hereinafter, preferred embodiments of the present disclosure will be described in detail with reference to the accompanying drawings. Prior to the description, it should be understood that the terms used in the specification and the appended claims should not be construed as being limited to general and dictionary meanings, but interpreted based on the meanings and concepts corresponding to technical aspects of the present disclosure on the basis of the principle that the inventor is allowed to define terms appropriately for the best explanation.

Mode for Disclosure

Figure 1:
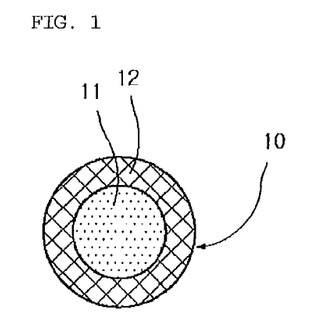
FIG. 1 is a cross-sectional view of a porous anode including a conductive core.
Figure 2:
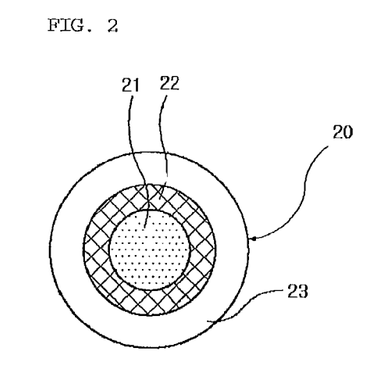
FIG. 2 is a cross-sectional view of a porous anode including a polymer core and a metal coating layer formed on the surface of the polymer core.

FIGS. 1 and 2 schematically illustrate porous anodes 10 and 20 according to embodiments of the present disclosure. However, the description proposed herein is just a preferable example for the purpose of illustrations only, not intended to limit the scope of the disclosure, so it should be understood that other equivalents and modifications could be made at the time of filing the present application.

Each of the anodes includes a core 11 as a current collector and a porous shell 12 as an anode active material coated to surround the outer surface of the core 11. The current collector has a horizontal cross section of a predetermined shape and extends in the lengthwise direction. The term "predetermined shape" means that the shape is not particularly limited and any shape is possible so long as the essential features of the present disclosure are not impaired. The current collector 11 may have a circular or polygonal structure in horizontal cross section. The circular structure is intended to include a geometrically perfect symmetrical circle and a geometrically asymmetrical ellipse. The polygonal structure of the current collector is not specifically limited, and non-limiting examples thereof include triangular, quadrangular, pentagonal and hexagonal shapes.

The anode active material 12 is coated on the surface of the current collector 11 by a suitable coating process, such as electroplating or anodic oxidation. The anode active material layer has a porous structure. Examples of such anode active materials include Si, Sn, Li, Zn, Mg, Cd, Ce, Ni, Fe, and oxides thereof. These anode active materials may be used alone or as a mixture of two or more thereof.

In the case where electroplating is used to form the active material layer on the surface of the current collector, hydrogen gas is generated. In this case, the amount of the hydrogen generated and the size of the hydrogen bubbles can be controlled such that the active material layer has a three-dimensional porous structure having a desired pore size.

Anodic oxidation is suitable for the formation of the active material layer using a metal oxide on the surface of the current collector. Oxygen gas is generated under the anodic oxidation conditions. The amount of the oxygen generated and the size of the oxygen bubbles can be controlled such that the active material layer has a one-dimensional porous channel structure.

The porous shell may have a pore size of 10 to 150 μm, a porosity of 60 to 95%, and a surface area of $8 \times 10^4$ to $5 \times 10^5$ cm$^2$/g.

The anode 10 of the present disclosure may be produced by the following method.

First, an aqueous solution of an anode active material is prepared (S1).

Specifically, the aqueous solution is prepared by dissolving an anode active material in an acidic aqueous solution. The anode active material is mainly provided as a precursor in the form of an acidic salt thereof. The anode active material may be selected from Si, Sn, Li, Zn, Mg, Cd, Ce, Ni and Fe. Si or Sn is particularly preferred.

Subsequently, a core as a current collector having a horizontal cross section in a predetermined shape and extending in the lengthwise direction is dipped in the aqueous solution of the anode active material, and then an electric current is applied to the core to form a porous shell on the outer surface of the core (S2).

Specifically, the core as a cathode and an anode as a counter electrode are dipped in a beaker containing the aqueous solution of the anode active material in an electroplating system, and then an electric current is applied thereto for a predetermined time period. During electroplating, the anode active material is precipitated on the core to form an anode active material layer. At this time, hydrogen gas is produced from the core to allow the anode active material layer to have a porous structure.

A secondary battery undergoes repeated expansion and contraction during charge/discharge. As a result, the secondary battery swells. This swelling is particularly severe when Sn or Si is used as an anode active material. Such a change in volume causes separation or degradation of the active material and induces side reactions of the active material, leading to deterioration of battery performance. Such problems can be solved by the porous structure of the active material layer of the anode according to the present disclosure that can function to relieve the volume change.

The porous active material layer increases the surface area of the anode in contact with the electrolyte to permit rapid and smooth migration of lithium ions, which is advantageous in electrochemical reactions, thereby bringing about an improvement in battery performance.

The current collector 11 in the form of a wire may be made of stainless steel, aluminum, nickel, titanium, baked carbon, copper, stainless steel surface treated with carbon, nickel, titanium or silver, aluminum-cadmium alloy, polyacetylene, polyaniline, polypyrrole, polythiophene or poly(sulfur nitride). The current collector in the form of a wire includes a polymer core 21 and a metal coating layer 22 formed on the surface of the polymer core. This structure is particularly preferred to ensure flexibility of a cable-type secondary battery.

Examples of materials for the polymer core 21 include polyacetylene, polyaniline, polypyrrole, polythiophene, poly(sulfur nitride), polyethylene (PE), polypropylene (PP), polyvinyl chloride (PVC), polyvinyl alcohol (PVA), polyacrylate and polytetrafluoroethylene (PTFE). The metal coating layer 22 may be formed of at least one metal selected from silver, palladium, nickel and copper.

The anode of the present disclosure is assembled to a cathode to construct an electrode assembly, which is used together with an electrolyte to fabricate a lithium secondary battery. The cathode and the electrolyte may be those commonly used in the fabrication of conventional lithium secondary batteries.

Preferably, the cathode uses a lithium-containing transition metal oxide as a cathode active material. Specific examples of such cathode active materials include $LiCoO_2$, $LiNiO_2$, $LiMnO_2$, $Li_2Mn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0\leq y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, and $LiFePO_4$. These cathode active materials may be used alone or as a mixture of two or more thereof. Other examples include sulfides, selenides and halides.

The electrolyte may be a gel-type solid electrolyte using PEO, PVdF, PMMA, PAN or PVAC, or a solid electrolyte using PEO, polypropylene oxide (PPO), polyethyleneimine (PEI), polyethylene sulphide (PES) or polyvinyl acetate (PVAc). The electrolyte may further include a lithium salt. Examples of such lithium salts include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylates and lithium tetraphenylborate.

With reference to FIGS. 3 to 7, a brief explanation will be given regarding specific structures of a cable-type secondary battery including the anode of the present disclosure. The same reference numerals represent the same or like elements throughout the drawings.

Figure 3:
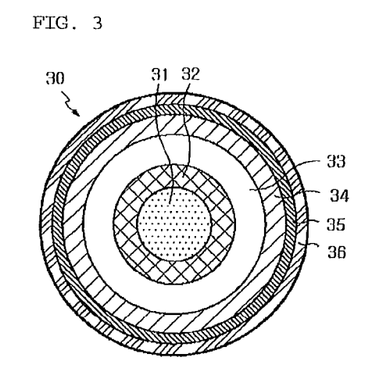
FIG. 3 is a cross-sectional view of a cable-type secondary battery including a porous anode according to an exemplary embodiment.

FIG. 3 illustrates a cable-type secondary battery 30 according to an embodiment. Referring to FIG. 3, the cable-type secondary battery 30 includes: an inner electrode as an anode consisting of a current collector 31 having a horizontal cross section in a predetermined shape and an anode active material 12 coated on the current collector 31; an electrolyte layer 33 as an ionic path filled to surround the inner electrode; an outer electrode as a cathode surrounding the outer surface of the electrolyte layer and consisting of a pipe-like current collector 35 having a horizontal cross section in a predetermined shape and a cathode active material 34 coated on the current collector 35; and a protective cover 36 disposed on the periphery of the outer electrode. The inner electrode may be provided in plurality. In this case, the inner electrodes are arranged in parallel. This configuration increases the contact area between the inner electrodes and the pipe-like outer electrode, leading to a high battery rate. The number of the inner electrodes can be appropriately determined to facilitate control of a balance between the capacity of the inner electrodes and the capacity of the outer electrode. In the cathode of the cable-type secondary battery, the active material 34 is coated on the current collector 35. The cathode is preferably produced by extrusion coating an electrode slurry including the active material on the current collector through an extruder. The cable-type secondary battery is fabricated by the following procedure. First, the active material 32 is electroplated on the current collector 31 to form the inner electrode. Subsequently, the electrolyte layer 33 is formed on the outer surface of the inner electrode by coating. Alternatively, the inner electrode may be inserted into the electrolyte layer 33. Then, the outer electrode and the protective cover 36 are sequentially formed on the outer surface of the electrolyte layer 33. Alternatively, the cable-type secondary battery may be fabricated by sequentially forming the outer electrode and the protective cover 36 on the electrolyte layer 33, and inserting the inner electrode into the electrolyte layer 33. Alternatively, the cable-type secondary battery may be fabricated by forming the outer electrode and the protective cover 36, inserting the inner electrode into the outer electrode, and filling the electrolyte layer 33 between the inner electrode and the outer electrode.

The protective cover as an insulator is formed on the outer surface of the battery to protect the electrodes against moisture in air and external impact. A general polymeric resin, for example, PVC, HDPE or epoxy resin, may be used as a material for the protective cover.

The cable-type secondary battery of FIG. 3 may be modified in structure. Some modified examples of the cable-type secondary battery are illustrated in FIGS. 4, 5, 6 and 7.

Figure 4:
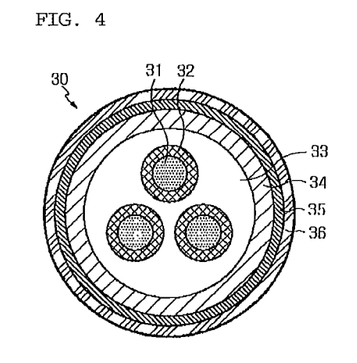
FIG. 4 is a cross-sectional view of a cable-type secondary battery including porous anodes according to an exemplary embodiment.

FIG. 4 illustrates a cable-type secondary battery 30 according to an exemplary embodiment. Referring to FIG. 4, the cable-type secondary battery 30 includes: inner electrodes as anodes arranged in parallel, each of which consists of a current collector 31 having a horizontal cross section in a predetermined shape and an anode active material 32 applied to the current collector 31; an electrolyte layer 33 as an ionic path filled to surround the inner electrodes; an outer electrode as a cathode surrounding the outer surface of the electrolyte layer and consisting of a pipe-like current collector 35 having a horizontal cross section in a predetermined shape and a cathode active material 34 applied to the current collector 35; and a protective cover 36 disposed on the periphery of the outer electrode. This configuration increases the contact area between the inner electrodes and the pipe-like outer electrode, leading to a high battery rate. The number of the inner electrodes can be appropriately determined to facilitate control of a balance between the capacity of the inner electrodes and the capacity of the outer electrode. In the cathode of the cable-type secondary battery, the active material 34 is applied to the current collector 35. A general coating process, such as electroplating or anodic oxidation, may be employed to apply the active material 34 to the current collector 35. The cathode is preferably produced by extrusion coating an electrode slurry including the active material on the current collector through an extruder. The cable-type secondary battery is fabricated by the following procedure. First, the active material 32 is electroplated on the current collectors 31 to form the inner electrodes. Subsequently, the electrolyte layer 33 is formed on the outer surfaces of the inner electrodes by coating. Alternatively, the inner electrodes may be inserted into the electrolyte layer 33. Then, the outer electrode and the protective cover 36 are sequentially formed on the outer surface of the electrolyte layer 33. Alternatively, the cable-type secondary battery may be fabricated by sequentially forming the outer electrode and the protective cover 36 on the electrolyte layer 33, and inserting the inner electrodes into the electrolyte layer 33. Alternatively, the cable-type secondary battery may be fabricated by forming the outer electrode and the protective cover 36, inserting the inner electrodes into the outer electrode, and filling the electrolyte layer 33 between the inner electrodes and the outer electrode.

Figure 5:
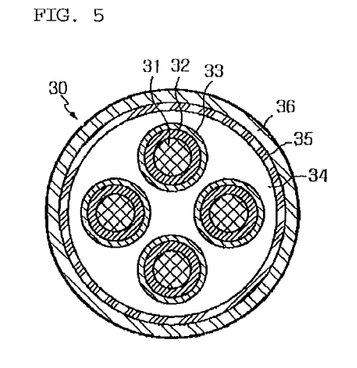
FIG. 5 is a cross-sectional view of a cable-type secondary battery including porous anodes according to an exemplary embodiment.

FIG. 5 illustrates a cable-type secondary battery 30 according to an exemplary embodiment. Referring to FIG. 5, the cable-type secondary battery 30 includes: two or more inner electrodes as anodes arranged in parallel, each of which consists of a current collector 31 and an anode active material 32 electroplated on the current collector 31, the current collector 31 having a horizontal cross section in a predetermined shape and extending in the lengthwise direction; electrolyte layers 33 as ionic paths, each of which is formed on the outer surface of the anode active material 31; an outer electrode as a cathode consisting of a cathode active material layer 34 filled to surround the inner electrodes and a current collector 35; and a protective cover 36 disposed on the periphery of the outer electrode. This configuration increases the contact area between the pipe-like outer electrode and the inner electrodes included in the outer electrode, leading to a high battery rate. The number of the inner electrodes can be appropriately determined to facilitate control of a balance between the capacity of the inner electrodes and the capacity of the outer electrode. The formation of the electrolyte layers on the inner electrodes can prevent shorting between the electrodes. The cable-type secondary battery is fabricated by the following procedure. First, each of the electrolyte layers 33 is formed on the inner electrode by coating. Then, the active material 34 is coated on the outer surfaces of the electrolyte layers 33. Alternatively, the inner electrodes may be inserted into the active material layer 34. Thereafter, the current collector 35 of the outer electrode and the protective cover 36 are sequentially formed on the outer surface of the active material layer 34. Alternatively, the cable-type secondary battery may be fabricated by forming the outer electrode, in which the active material is filled, and the protective cover 36, and inserting the inner electrodes, on which the electrolyte layers 33 are formed, into the active material. Alternatively, the cable-type secondary battery may be fabricated by forming the current collector 35 of outer electrode and the protective cover 36, inserting the inner electrodes, on which the electrolyte layers 33 are formed, into the current collector 35, and filing the active material 34 between the electrolyte layers 33 and the inner electrodes.

Figure 6:
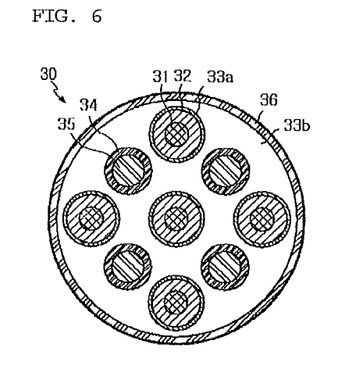
FIG. 6 is a cross-sectional view of a cable-type secondary battery including porous anodes according to an exemplary embodiment.

FIG. 6 illustrates a cable-type secondary battery 30 according to an exemplary embodiment. Referring to FIG. 6, the cable-type secondary battery 30 includes: one or more anodes, each of which consists of a current collector 31 and an anode active material 32 electroplated on the current collector 31, the current collector 31 having a horizontal cross section in a predetermined shape and extending in the lengthwise direction, a first electrolyte layer 33a as an ionic path being formed on the outer surface of the anode active material 32; one or more cathodes, each of which consists of a current collector 35 and a cathode active material 34 applied to the current collector 35, the current collector 35 having a horizontal cross section in a predetermined shape and extending in the lengthwise direction; a second electrolyte layer 33b as an ionic path allowing the anodes and the cathodes to be arranged in parallel and filled to surround the anodes and the cathodes; and a protective cover 36 disposed on the periphery of the second electrolyte layer 33b. An electrolyte layer may be formed on each of the cathodes to prevent shorting between the electrodes. This configuration increases the contact area between the cathodes and the anodes, leading to a high battery rate. The number of the anodes and the cathodes can be appropriately determined to facilitate control of a balance between the capacity of the anodes and the capacity of the cathodes. The cable-type secondary battery is fabricated by the following procedure. First, the first electrolyte layers 33a are coated on the anode active material 32 and the second electrolyte layer 33b is coated so as to surround the anodes and the cathodes. Alternatively, the anodes, on which the electrolyte layers 33a are formed, and the cathodes may be inserted into the second electrolyte layer 33b. Then, the protective cover 36 is formed on the outer surface of the second electrolyte layer 33b. Alternatively, the cable-type secondary battery may be fabricated by forming the second electrolyte layer 33b and the protective cover 36, and inserting the anodes, on which the electrolyte layers 33a are formed, and the cathodes into the second electrolyte layer 33b.

Figure 7:
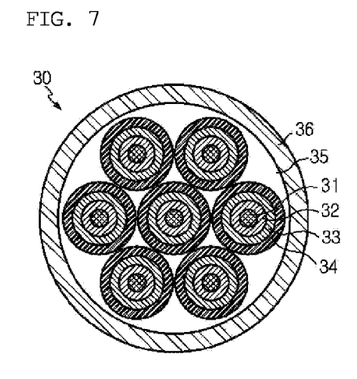
FIG. 7 is a cross-sectional view of a cable-type secondary battery including porous anodes according to an exemplary embodiment.

FIG. 7 illustrates a cable-type secondary battery 30 according to an exemplary embodiment. Referring to FIG. 7, the cable-type secondary battery 30 includes: a plurality of inner electrodes arranged in parallel, each of which consists of a porous anode, an electrolyte layer 33 formed on the anode and a cathode active material layer 34 formed on the surface of the electrolyte layer 33, the porous anode consisting of an inner current collector 31 and an anode active material 32 electroplated on the inner current collector 31, the inner current collector 31 having a horizontal cross section in a predetermined shape and extending in the lengthwise direction; an outer current collector 35 filled to surround the inner electrodes; and a protective cover 36 disposed on the periphery of the outer current collector 35. This configuration increases the contact area between the inner electrodes and the outer current collector, leading to a high battery rate. The number of the inner electrodes can be appropriately determined to facilitate control of a balance of the capacity of the electrodes.

Hereinafter, preferred embodiments of the present disclosure will be described in detail. The embodiments of the present disclosure, however, may take several other forms, and the scope of the present disclosure should not be construed as being limited to the following examples. The embodiments of the present disclosure are provided to more fully explain the present disclosure to those having ordinary knowledge in the art to which the present disclosure pertains.

EXAMPLES

Example 1

Production of Wire-Like Porous Anode

A wire-like copper current collector was washed with acetone and dilute hydrochloric acid. The copper current collector as a cathode and platinum as an anode were dipped in a solution of 0.15 M $SnSO_4$ and 1.5 M $H_2SO_4$. Thereafter, electroplating was performed while allowing a current of 3 $A/cm^2$ or above to flow between the cathode and the anode. Tin was precipitated on the copper current collector to produce a wire-like porous anode.

Comparative Example 1

Production of Film-Like Porous Anode

A film-like copper current collector was washed with acetone and dilute hydrochloric acid. The copper current collector as a cathode and platinum as an anode were dipped in a solution of 0.15 M $SnSO_4$ and 1.5 M $H_2SO_4$. Thereafter, electroplating was performed while allowing a current of 3 $A/cm^2$ or above to flow between the cathode and the anode. Tin was precipitated on the copper current collector to produce a film-like porous anode.

Test Example 1

Identification of Porous Structure of Porous Anode

Figure 8:
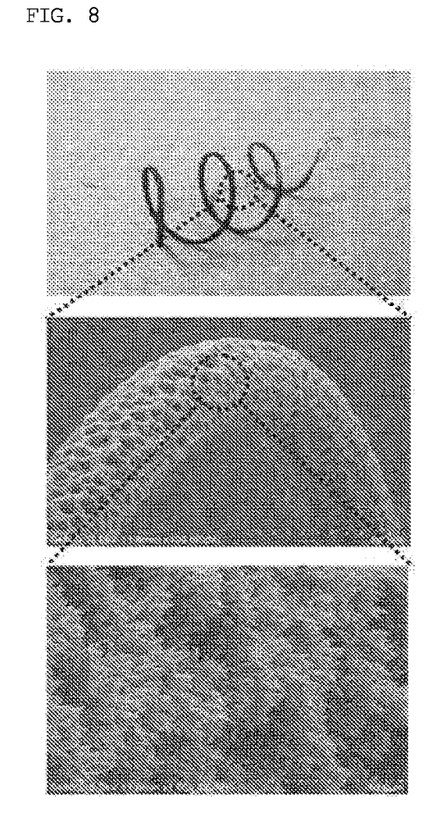
FIG. 8 shows SEM images of a porous anode produced in Example 1.

SEM images of the porous anode produced in Example 1 are shown in FIG. 8. The images of FIG. 8 reveal a three-dimensional porous structure of the anode active material layer formed of tin on the surface of the copper current collector.

Test Example 2

Measurement of Performance of Cells

A beaker cell in the form of a 3-electrode electrochemical cell was fabricated using lithium foils as counter and reference electrodes, each of the anodes produced in Example 1 and Comparative Example 1 as a working electrode and a solution of 1 M $LiPF_6$ in EC/DEC (50/50, v/v)) as an electrolyte solution. The tests were conducted in a glove box (Ar gas).

The charge-discharge characteristics of the cells were evaluated. The results are shown in FIGS. 9 and 10.

Each of the cells was charged to 5 mV with a current density of 0.5 C under constant current conditions and maintained at a constant voltage of 5 mV. Charging was stopped when the current density reached 0.005 C.

The cell was discharged to 2 V with a current density of 0.5 C in a CC mode. Charge and discharge cycles were repeated fifty times under the same conditions as above.

Figure 9:
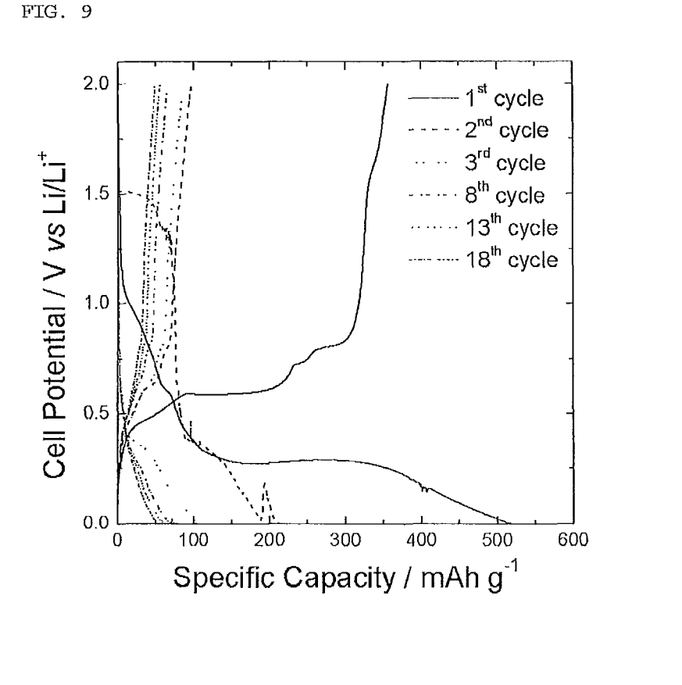
FIG. 9 graphically shows the performance of a half cell including an anode produced in Comparative Example 1.
Figure 10:
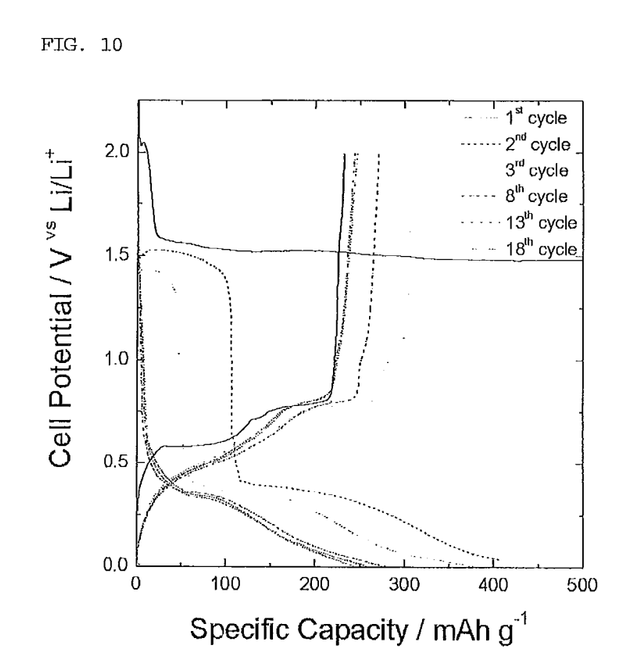
FIG. 10 graphically shows the performance of a half cell including an anode produced in Example 1.

The graphs of FIGS. 9 and 10 reveal that the cell using the wire-like porous electrode has a higher capacity and better performance than the cell using the film-like porous electrode.

What is claimed is:

1. An anode for a cable-type secondary battery, comprising a core as a current collector and
a porous shell as an anode active material coated to surround the outer surface of the core,
the current collector having a horizontal cross section in a predetermined shape and extending in the lengthwise direction,
wherein the porous shell has a pore size of 10 to 150 μm.

2. The anode according to claim 1, wherein the anode active material comprises at least one element or compound selected from the group consisting of Si, Sn, Li, Zn, Mg, Cd, Ce, Ni, Fe and oxides thereof.

3. The anode according to claim 2, wherein the anode active material is Si, Sn or a mixture thereof.

4. The anode according to claim 1, wherein the current collector is stainless steel, aluminum, titanium, silver, palladium, nickel, copper, or stainless steel surface treated with titanium, silver, palladium, nickel or copper.

5. The anode according to claim 1, wherein the current collector comprises a polymer core and a metal coating layer formed on the surface of the polymer core.

6. The anode according to claim 5, wherein the polymer core is made of at least one polymer selected from the group consisting of polyacetylene, polyaniline, polypyrrole, polythiophene, poly(sulfur nitride), polyethylene (PE), polypropylene (PP), polyvinyl chloride (PVC), polyvinyl alcohol (PVA), polyacrylate and polytetrafluoroethylene (PTFE).

7. The anode according to claim 5, wherein the metal coating layer is formed of at least one metal selected from titanium, silver, palladium, nickel and copper.

8. The anode according to claim 1, wherein the porous shell has a porosity of 60 to 95%.

9. The anode according to claim 1, wherein the porous shell has a surface area of $8 \times 10^4$ to $5 \times 10^5$ $cm^2/g$.

10. A cable-type secondary battery comprising the anode according to claim 1.

11. A cable-type secondary battery, comprising:
an inner electrode as an anode comprising a core as a current collector and a porous shell as an anode active material coated to surround the outer surface of the core, the core having a horizontal cross section in a predetermined shape and extending in the lengthwise direction, wherein the porous shell has a pore size of 10 to 150 μm;
an electrolyte layer as an ionic path filled to surround the inner electrode;
an outer electrode as a cathode surrounding the outer surface of the electrolyte layer and comprising a pipe-like current collector having a horizontal cross section in a predetermined shape and a cathode active material layer formed on the current collector; and
a protective cover disposed on the periphery of the outer electrode.

12. The cable-type secondary battery according to claim 11, wherein the cathode active material layer is formed of particles of at least one cathode active material $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (wherein M1 and M2 are each independently selected from the group consisting of Al, Ni, Co, Fe, Mn, V, Cr, Ti, W, Ta, Mg and Mo, and x, y and z represent the atomic fractions of the corresponding constituent elements of the oxide and satisfy the relations of $0 \leq x < 0.5$, $0 \leq y < 0.5$, $0 \leq z < 0.5$, $x+y+z \leq 1$).

13. The cable-type secondary battery according to claim 11, wherein the electrolyte layer is formed of a gel-type solid electrolyte using poly(ethylene oxide) (PEO), poly(vinylidene fluoride) (PVdF), poly(vinylidene fluoridehexafluoro propylene) (PVdF-HFP), poly(methyl methacrylate) (PMMA), polyacrylonitrile (PAN) or PVAc (polyvinyl acetate), or a solid electrolyte using poly(ethylene oxide) (PEO), polypropylene oxide (PPO), polyethyleneimine (PEI), polyethylene sulphide (PES) or polyvinyl acetate (PVAc).

14. The cable-type secondary battery according to claim 11, wherein the electrolyte layer further comprises a lithium salt.

15. The cable-type secondary battery according to claim 14, wherein the lithium salt is selected from LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lithium lower aliphatic carboxylates, lithium tetraphenylborate, and mixtures of two or more thereof.

16. A cable-type secondary battery, comprising:
two or more inner electrodes as anodes arranged in parallel, each of which comprises a core as a current collector and a porous shell as an anode active material coated to surround the outer surface of the core, the core having a horizontal cross section in a predetermined shape and extending in the lengthwise direction;
an electrolyte layer as an ionic path filled to surround the inner electrodes;
an outer electrode as a cathode surrounding the outer surface of the electrolyte layer and comprising a pipe-like current collector and a cathode active material layer formed on the current collector; and
a protective cover disposed on the periphery of the outer electrode.

17. A cable-type secondary battery, comprising:
two or more inner electrodes as anodes arranged in parallel, each of which comprises a core as a current collector, a porous shell as an anode active material coated to surround the outer surface of the core, the core having a horizontal cross section in a predetermined shape and extending in the lengthwise direction, and an electrolyte layer as an ionic path being formed on the outer surface of the shell;
an outer electrode as a cathode comprising a cathode active material layer filled to surround the inner electrodes and a pipe-like current collector; and
a protective cover disposed on the periphery of the outer electrode.

18. A cable-type secondary battery, comprising:
one or more anodes, each of which comprises a core as a current collector and a porous shell as an anode active material coated to surround the outer surface of the core, the core having a horizontal cross section in a predetermined shape and extending in the lengthwise direction, a first electrolyte layer as an ionic path being formed on the outer surface of the shell, wherein the porous shell has a pore size of 10 to 150 μm;
one or more cathodes, each of which comprises a current collector and a cathode active material layer formed on the current collector, the current collector having a horizontal cross section in a predetermined shape and extending in the lengthwise direction;
a second electrolyte layer as an ionic path allowing the anodes and the cathodes to be arranged in parallel and filled to surround the anodes and the cathodes; and
a protective cover disposed on the periphery of the second electrolyte layer.

19. A cable-type secondary battery, comprising:
two or more anodes, each of which comprises a core as a current collector, a porous shell as an anode active material coated to surround the outer surface of the core, the core having a horizontal cross section in a predetermined shape and extending in the lengthwise direction, an electrolyte layer as an ionic path being formed on the outer surface of the shell, and a cathode active material layer being formed on the surface of the electrolyte layer;
a current collector allowing the anodes to be arranged in parallel and filled to surround the anodes; and
a protective cover disposed on the periphery of the current collector.

* * * * *